O. TABER.
HORSE HAY-FORK.
No. 169,740.
Patented Nov. 9, 1875.
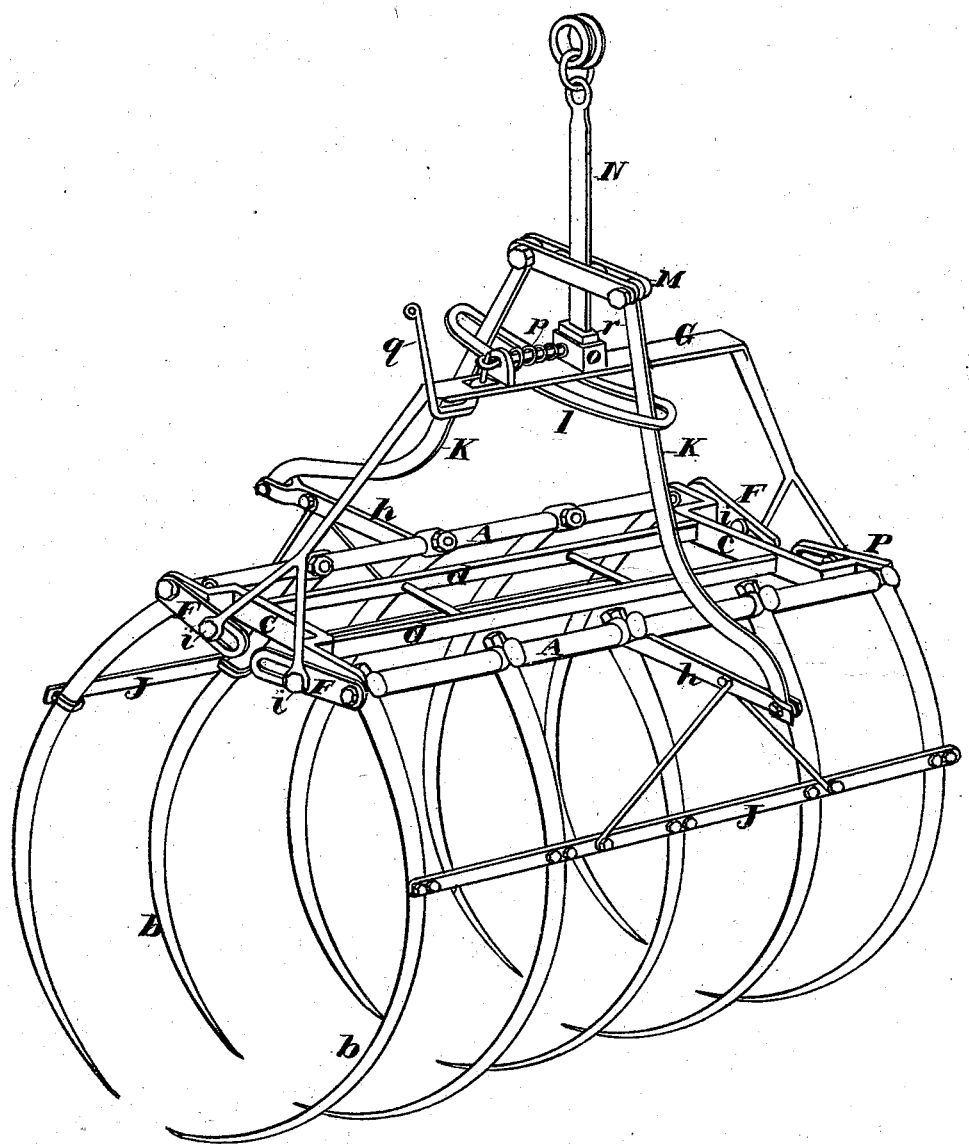
Witnesses
Geo. H. Strong.
C. M. Richardson
Inventor
Orrin Taber
By his Attorneys
Dewey & Co.

UNITED STATES PATENT OFFICE.

ORRIN TABER, OF SANTA CLARA, CALIFORNIA.

IMPROVEMENT IN HORSE HAY-FORKS.

Specification forming part of Letters Patent No. 169,740, dated November 9, 1875; application filed July 23, 1875.

*To all whom it may concern:*

Be it known that I, ORRIN TABER, of Santa Clara, Santa Clara county, State of California, have invented an Improved Horse Hay-Fork; and I do hereby declare the following description and accompanying drawings are sufficient to enable any person skilled in the art or science to which it most nearly appertains to make and use my said invention or improvement without further invention or experiment.

My invention relates to improvements in the construction and arrangement of that class of horse hay-forks in which two sets of grasping forks or fingers are operated to close upon or seize a quantity of hay between them, and release it when the fingers are separated.

My improvement relates to the mechanical devices for operating the two sets of fingers, by which I secure the requisite amount of strength, together with positive action of the grasping and releasing fingers.

In order to more fully describe my invention, reference is had to the accompanying drawing forming a part of this specification, in which the figure shown is a perspective view of my fork.

A A are the heads of the two sets of forks or fingers, and b b b are the fingers. The heads A of the two sets of fingers are journaled in the opposite ends of two end plates, c c, and these end plates are connected together between the heads A by means of rods or bars d d, which extend across parallel with the heads, thus providing a spacing-frame for separating the heads and permitting the points of the fingers b b to describe a larger curve when they open and close than if the heads were closer together, consequently causing them to enter the body of hay with greater ease.

Each set of fingers is secured by a brace, J, which passes across below the rake-heads.

The journals of the heads A A extend through the plates c c, and a slotted crank, F, is secured to each journal, as represented.

A lifting-bar, G, has its opposite ends bifurcated, as shown, and the extremity of each fork is secured by a bolt, i, in the slot of one of the crank-arms. This lifting-bar is so bent that it forms a yoke above the fork-head.

A lever, h, extends outward from the middle of each fork-head, and is properly braced from the brace-bar J. A bar, K, has one end hinged to the outer end of each lever h, and these bars are bent toward each other, and pass up on opposite sides of the lifting-bar G, through slots in the opposite ends of the plate l, which is secured to the middle of the lifting-bar, and their upper ends are connected by a link, M.

A bar, N, passes down through the link M, and its opposite end enters a socket, o, which is formed on the middle of the lifting-bar, where it can be secured by a spring-bolt, p. This bolt is operated by a trip-lever, q, so that it can be withdrawn, so as to release the bar N, when desired. A flange, r, on the lower end of the bar N catches on the under side of the link M when the bolt is withdrawn.

The rope which suspends the fork from the derrick is secured to the upper end of the bar N, and when the lower end of the bar is secured in the socket o the weight of the fork and its load is suspended from the lifting-bar, and as the lifting-bar is attached to the crank-arms the pull upon it closes the fingers or fork-teeth together upon the load. When the load has been lifted to the point where it is to be deposited, a rope, which is connected with the trip-lever, is pulled, so as to withdraw the bolt p, thus releasing the strain on the cranks, and allowing the weight of the load to force the fingers apart and deposit the load.

I thus provide a simple and substantial arrangement, by which the forks are operated easily and automatically.

Having thus described my invention, what I claim, and desire to secure by Letters Patent, is—

1. The fork-heads A A, with their slotted crank-arms F F, in combination with the lifting-bar N, with its bifurcated ends, substantially as and for the purpose described.

2. A horse hay-fork consisting of the rake-heads A, with their fingers b b b, slotted crank-arms F F, and lever h, in combination with the frame c c d d, lifting-bar G, with its slotted guide-plate l and socket o, bars k k, united at the upper ends by the link M, bar N, and spring-bolt p, operated by the trip-lever q, all combined and arranged to operate substantially as and for the purpose described.

ORRIN TABER. [L. S.]

Witnesses:
M. S. WILSON,
C. C. SIMPSON.